March 2, 1926.

G. W. MacKENZIE ET AL

ATMOSPHERIC VALVE

Filed June 24, 1921

1,575,351

INVENTORS.
William L. MacMillan
George W. MacKenzie
by C. M. Clarke
Atty.

Patented Mar. 2, 1926.

1,575,351

UNITED STATES PATENT OFFICE.

GEORGE W. MacKENZIE AND WILLIAM C. MacMILLEN, OF BEAVER, PENNSYLVANIA, ASSIGNORS TO GUARANTEE LIQUID MEASURE COMPANY, OF ROCHESTER, PENNSYLVANIA, A CORPORATION OF DELAWARE.

ATMOSPHERIC VALVE.

Application filed June 24, 1921. Serial No. 480,142.

*To all whom it may concern:*

Be it known that we, GEORGE W. MacKENZIE and WILLIAM C. MacMILLEN, citizens of the United States, residing at Beaver, in the county of Beaver and State of Pennsylvania, have invented certain new and useful Improvements in Atmospheric Valves, of which the following is a specification.

Our invention consists of an improvement in atmospheric valves, and is particularly adapted to use in connection with the control of circulation through a vacuum line for exerting suction.

It is especially designed for use in connection with a liquid storage and supply system similar to that of co-pending application therefor of George W. MacKenzie, Serial No. 480,104, filed June 24, 1921, but it will be obvious that it may be used in various other ways, or in connection with other mechanism requiring the opening of a line to vacuum or to the atmosphere alternately.

In the drawings showing one preferred construction of the invention,

Figure 1:
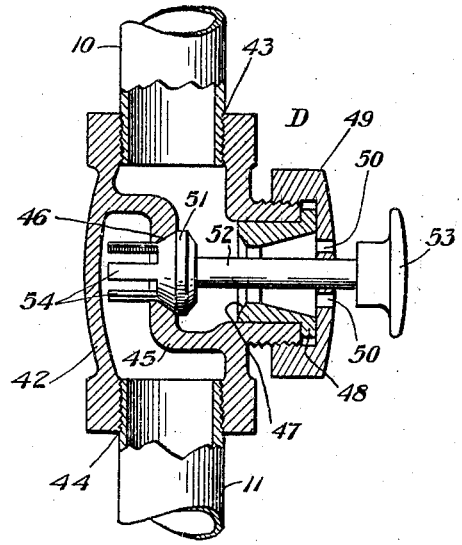
Fig. 1 is a vertical sectional view through the valve, showing the same closed to vacuum, and open to atmosphere.
Figure 2:
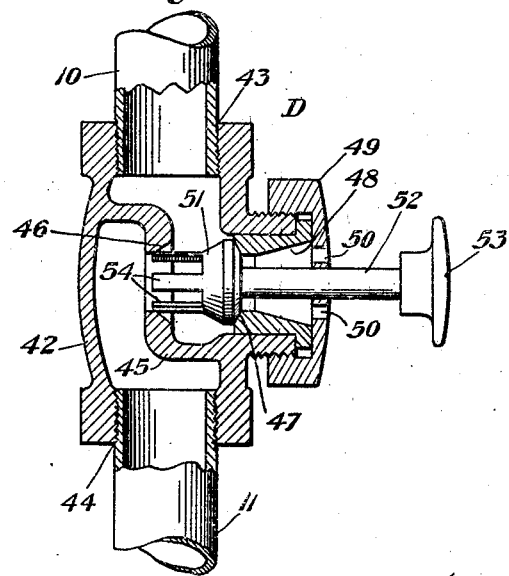
Fig. 2 is a similar view showing the reverse position.

The valve generally is indicated by the letter D and consists of a casing 42 connected at 43 with a pipe 10 leading to any element desired to be placed in communication with a vacuum exerting or suction creating element through pipe 11 connected with the opposite end of the valve, as at 44.

The valve has an intermediate transverse wall 45 and a valve seat port 46 therein. Opposite the valve 46 is a valve seat 47 on hollow bushing 48 secured in position by threaded cap 49 having ports 50 leading to the atmosphere. A double seated valve 51 extends by stem 52 outwardly through the guiding center of cap 49, and is provided with a terminal button 53 and centering prong guides 54 at its inner end.

In operation, the suction of the vacuum creating element through pipe 11 will normally hold valve 51 to a closing seat on port 46, the interior of pipe 10 being open to the atmosphere through ports 50. When it is desired to put suction pipe 10 into communication with pipe 11, valve 51 is withdrawn by its stem and button, seating the other face of the valve against port 47 and establishing suction between said pipes. When it is desired to terminate the suction communication, the operator releases the button, when valve 51 will be re-seated by suction, closing port 46 and opening pipe 10 to the atmosphere through ports 50.

The operation of the valve thereby involves merely withdrawal of the stem and holding it open until the desired vacuum or suction connection is completed, the valve then resuming its closed position upon release.

The construction is comparatively simple, avoids the necessity of springs or any adjusting devices, and is continuously operative and reliable.

What we claim is:

1. In an atmospheric valve, the combination of a casing having opposite circulation connections, an intervening partition having a valve port about which is a valve seat, a hollow bushing opening to the atmosphere and provided with an annular valve seat opposite the port in the partition, a reciprocably mounted valve stem for closing one or the other of said ports, and an outer cap screwed on the casing having a central valve stem bearing and an atmospheric air port communicating with the interior of the bushing.

2. A self-closing valve for exhaust lines comprising a casing having alined inlet and exhaust passages at the opposite ends thereof, a partition in the casing having a port therein, an air inlet port opposite the port in said partition, a valve member in the casing between the two ports and adapted to seat on the part surrounding either port, and a valve stem slidably carried by guiding means on the casing and on which said valve member is carried.

3. A valve comprising a body having a central partition therein and having inlet and exhaust passages on opposite sides of the partition, said partition having a port therethrough through which communication between the inlet and exhaust passages connect, an extension on the body in alignment with said port, a bushing in the extension having a valve seat thereon, a cap removably secured to the extension and retaining the bushing in place, a valve stem slidably passed through the cap, said cap having air ports therein, a valve member on said stem between the seat on the bushing and the port in the partition and adapted to seat on either the partition surrounding the port or to seat on the bushing, and actuating means on the valve stem.

In testimony whereof we hereunto affix our signatures.

GEORGE W. MacKENZIE.
WILLIAM C. MacMILLEN.